United States Patent [19]

Prudenzi

[11] 4,045,901
[45] Sept. 6, 1977

[54] TRAWLER DOORS

[76] Inventor: Augusto Prudenzi, 84 Partridge Ave., Somerville, Mass. 02145

[21] Appl. No.: 727,952

[22] Filed: Sept. 29, 1976

[51] Int. Cl.² ............................................. A01K 73/04
[52] U.S. Cl. ........................................... 43/9; 43/43.13
[58] Field of Search ............................ 43/9, 8, 43.13

[56] References Cited

U.S. PATENT DOCUMENTS

| 2,066,519 | 1/1937 | Clark | 43/9 |
| 3,353,293 | 11/1967 | Luketa | 43/43.13 |

FOREIGN PATENT DOCUMENTS

| 869 | 6/1898 | United Kingdom | 43/9 |
| 228,703 | 2/1925 | United Kingdom | 43/9 |

Primary Examiner—Warner H. Camp
Attorney, Agent, or Firm—Kenneth D. Hudson

[57] ABSTRACT

A cooperating pair of trawler doors is disclosed wherein each door comprises a longitudinally arcuate body with a convex inner side and a concave outer side, at least one louver in the body providing slots for passage of water through the doors, first attaching means affixed to the forward portion of the convex inner side for attachment of the forward portion of a tow line to the towing vessel, and second attaching means affixed to the aft portion of the concave outer side of the door for attachment of the aft portion of the towline to a trawler net.

6 Claims, 3 Drawing Figures

TRAWLER DOORS

BACKGROUND OF THE INVENTION

This invention relates to trawler doors, sometimes known as otter doors, used in trawler fishing for attachment, respectively, to towlines extending from a towing vessel to the sides of a trawler net and adapted to cause the towlines to diverge when towed to hold open the side of the mouth of the net.

Trawler doors are well known and are disclosed for example in U.S. Pat. Nos. 1,582,641; 3,007,273; and 3,299,560. Two types of doors in common use are flat, wooden, rectangular doors having a metal frame and projecting arms for attachment to the towlines, and metal arcuate doors with inner concave sides towed at a substantial angle to the direction of forward motion. Both types of doors require substantial maintenance and power to tow them through the water. The arcuate metal doors require significantly greater power than the wooden doors and their use is generally restricted to larger vessels.

It is the principal object of the present invention to provide improved trawler doors which are easy and inexpensive to manufacture, require reduced maintenance, require less power in use, and which maintain their position under tow with a minimum of towline entanglement.

SUMMARY OF THE INVENTION

According to the present invention, a pair of cooperating trawler doors for fishing is provided, the doors being adapted for attachment, respectively, to a pair of towlines affixed one to each side of the open mouth of the trawler net and to hold the mouth open by causing the towlines to diverge as the net is towed through the water, each door comprising a longitudinally arcuate body portion with a convex inner side and a concave outer side, at least one and preferably two or more louvers in the body portion providing a plurality of slots having a substantial vertical component for passage of water through the door from one side to the other as the door is towed through the water, first attaching means affixed to the forward portion of the convex inner side of the door for attaching the forward portion of one of said towlines to the towing vessel, and second attaching means affixed to the aft portion of the concave side of the door for attaching the aft portion of said towline to the net.

Preferably the body of each door is longitudinally elongate and comprises a plurality of plates of sheet material joined to top and bottom stiffening members, the louvers are inclined with their trailing edges extending toward the inner convex side of the door to channel water through the door from the concave outer side to the convex inner side, the first attachment means comprises one or more projecting flanges on the inner convex side of the door with an effective center somewhat above the longitudinal centerline of the door, and the lower edge of the door is weighted to submerge it in the sea in a substantially vertical disposition.

DESCRIPTION OF PREFERRED EMBODIMENTS

In the accompanying drawings

Figure 1:
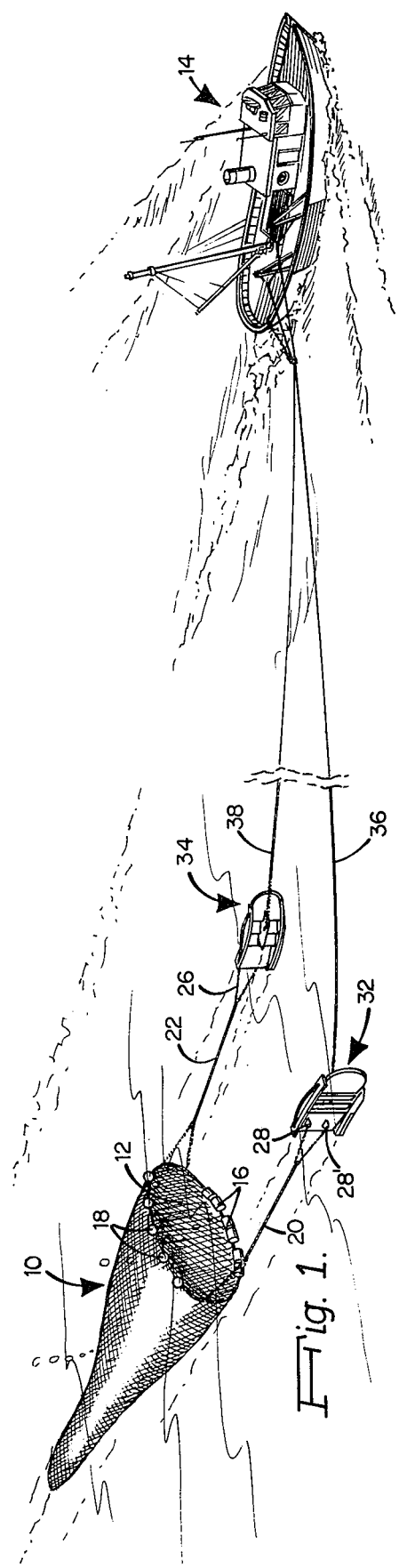
FIG. 1 is a perspective view of a trawler net joined to a towing trawler by means of towlines to which a pair of trawler doors according to the present invention are affixed.
Figure 2:
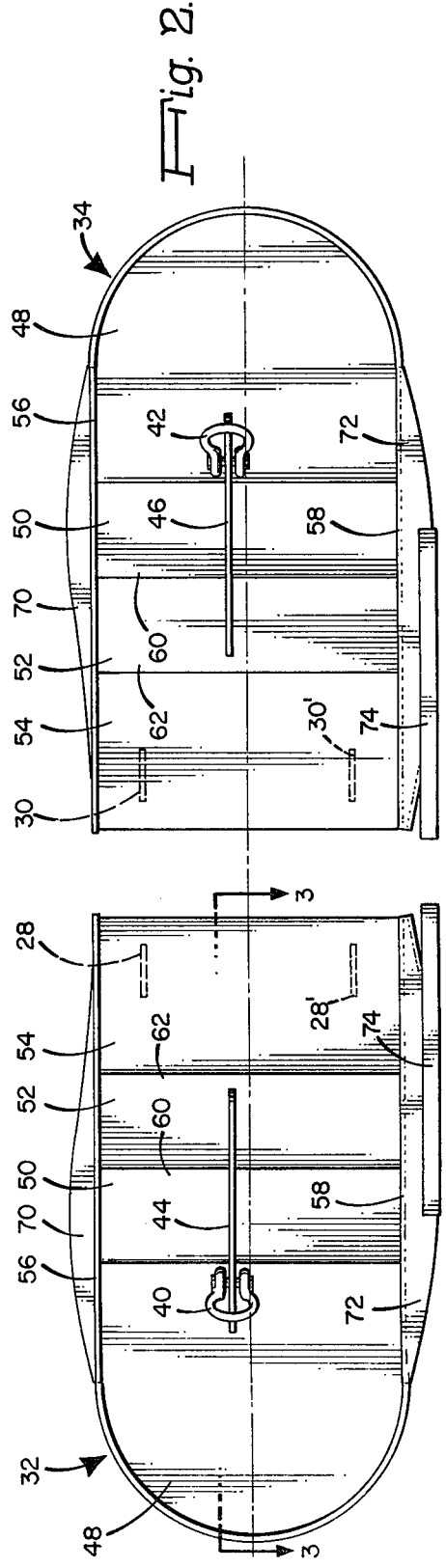
FIG. 2 is a side view of the trawler doors with their trailing edges juxtaposed to show the inner convex sides of the doors which face each other in use; and, FIG. 3 is a section on the line 3—3 of FIG. 2.

Referring to the drawings, a conical trawler net 10 having a open mouth 12 is towed through the sea by trawler 14. The net 10 scoops fish and other marine life as it is towed through the sea, frequently at a substantial depth and usually on or near the bottom of the body of water being fished. The lower edge of the net mouth 12 carries weighted rollers 16 and the upper edge carries buoyant floats 18. The sides of the net are secured to the rear portions 20 and 22 of towlines which branch to form yokes 26 which are shackled to mounting flanges 28, 28' and 30, 30', respectively. The forward portions 36 and 38 of the towlines extending from trawler 14 are secured respectively to shackles 40 and 42 carried by flanges 44 and 46 fixed, respectively, to the inner convex sides of trawler doors 32 and 34.

As the trawler 14 moves through the water, the net 10 is towed by lines 36, 20 and 38, 22. Weighted rollers 16 and buoyant floats 18 cooperate to hold open the mouth of the net in a vertical direction. Cooperating trawler doors 32, 34 move apart or diverge as they move through the sea to hold open the sides of the net.

Figure 3:
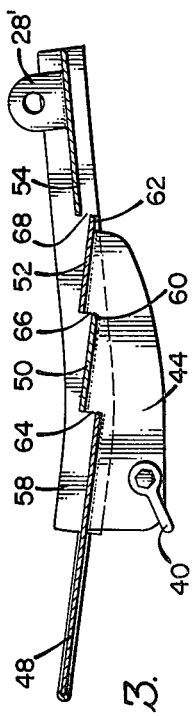

The trawler doors 32 and 34 are essentially mirror images of each other. Each comprises a body portion having four plates 48, 50, 52 and 54 rigidly joined by welding or the like to upper and lower stiffening members or transverse flanges 56 and 58 respectively. As shown in FIG. 3, the vertical body plates 48, 50, 52 and 54 are secured to the horizontal flanges 56 and 58 at angles which form an arcuate contour in longitudinal section. The inner convex sides of the doors face each other in use while the outer concave faces face away from each other. Intermediate plates 50 and 52 are offset or inclined from the arcuate centerline to form louvers with their trailing edges 60 and 62, respectively, extending toward the mounting flanges 44 or 46 on the inner convex sides of the doors. These louvers provide slots 64, 66 and 68 through which water passes from the concave outer faces to the convex inner faces through the doors as the doors are towed through the sea to reduce drag, increase stability and assist in causing the doors to diverge. One or more louvers may be employed, but two are preferred as shown. Slots 64, 66 and 68 are preferably vertical as shown but may be angled somewhat if desired. If angled, they should have a substantial vertical component and should not be horizontal. Preferably, they extend fully between members 56 and 58 as shown. Front plates 48 have a curved leading edge as illustrated to reduce drag.

Preferably a vertical streamlined fin 70 is affixed to upper horizontal mounting flange 56. One or more weighted wear plates 72 and 74 are affixed to the lower mounting flange 58 to weight the lower edges of the doors, causing them to submerge in a substantially vertical position in the sea. Plates 72 and/or 74 may be replaced to compensate for wear to change the weighted character of the doors and therefore the depth to which they submerge.

In use, the pair of doors are disposed in the sea with their convex sides and tow flanges 44 and 46 facing each other, shackles 40 and 42 being located approximately one-third the distance aft of the doors from the leading edges and somewhat above the horizontal centerline of the doors. Single attaching flanges 44 and 46 for each door are preferred as shown. However, other or additonal attachment means can be employed, if desired, provided their effective center for towline attachment is substantially as described. Each pair of attaching flanges 28, 28' and 30, 30' are located near the rear surface of rear plate 54 with the midpoint between them preferably being somewhat above the horizontal centerline of the doors. When towed through the water, the doors 32, 34 move away from each other with a relatively minimal angle of attack and remain substantially vertical in the sea, even when the trawler turns, to minimize the power required to tow the doors and avoid fouling of the towlines. The slots 64, 66 and 68 provided by the louvers 50 and 52 in each door permit water to flow through the body portion to minimize drag and assist in diverging the towlines.

It should be noted that the construction of the doors is relatively simple and inexpensive. The parts can be made from sheet metal or the like and rigidly joined in any suitable manner, for example by welding. In addition to the ease and economy of manufacture and maintenance, and reliability in use, the doors require significantly less power than trawler doors heretofore employed. For example, in one test at sea it was found that a pair of doors according to this invention required about 150 less engine RPM to maintain speed compared to the use of a conventional pair of wooden doors.

It should be understood that the foregoing description is for the purpose of illustration and that the invention includes all equivalents and modifications within the scope of the appended claims.

I claim:

1. A pair of cooperating trawler doors for fishing, said doors being adapted for attachment, respectively, to a pair of towlines affixed one to each side of the open mouth of a trawler net and to hold the mouth open by causing the towlines to diverge as the net is towed through the water, each door comprising upper and lower stiffening members and at least three sheet metal plates affixed therebetween, the front and rear plates extending over a majority of the area of each door and defining a longitudinally arcuate body portion with a convex inner side and a concave outer side, at least one intermediate plate being offset from the arc of said body portion to form a louver providing a plurality of slots having a substantial vertical component for passage of water through the door from one side to the other as the door is towed through the water, first attaching means affixed to the forward portion of the convex inner side of the door for attaching the forward portion of one of said towlines to the towing vessel, and second attaching means affixed to the aft portion of the concave side of the door for attaching the aft portion of said towline to the net.

2. A pair of trawler doors according to claim 1 wherein said louver is inclined with its trailing edges extending toward the inner convex face of the door to channel water through the door from the concave outer side to the convex inner side.

3. A pair of doors according to claim 2 wherein said first attachment means is located above the longitudinal centerline of the door and comprises a longitudinally extending horizontally projecting flange.

4. A pair of doors according to claim 2 wherein each door has an arcuate front edge and wherein the lower edge is weighted to submerge the door in the sea in a substantially vertical disposition with respect to the sea floor.

5. A pair of cooperating trawler doors adapted for attachment, respectively, to a pair of towlines affixed one to each side of the open mouth of a trawler net and to hold the mouth open by causing the towlines to diverge as the net is towed through the water, each door comprising a longitudinally arcuate body portion comprising four plates of sheet metal joined to top and bottom stiffening members of sheet metal extending transversely of said plates, two of said plates comprising intermediately disposed louvers defining a plurality of slots having a substantial vertical component, said louvers being inclined with their trailing edges extending toward the inner convex side of the doors to channel water through the door from the concave outer side to the inner convex side as the door is towed through the water, the front and rear plates extending over a major portion of each door, all of said plates being substantially flat in vertical dimension, weighting means attached to the lower portion of the doors, a projecting flange affixed to the inner convex side of the door providing first attaching means located above the longitudinal centerline and approximately one-third the distance aft from the leading edge of the door for attaching the forward portion of one of said towlines to the towing vessel, and second projecting means affixed to the aft portion of the concave side of the door for attaching the aft portion of the towline to the net.

6. A pair of trawler doors according to claim 5 wherein said doors are longitudinally elongate, and said louvers are disposed transversely of the longitudinal centerline of the doors to provide substantial vertical slots therein.

* * * * *